MOUNTED CIRCUIT ELEMENT
Filed March 20, 1967
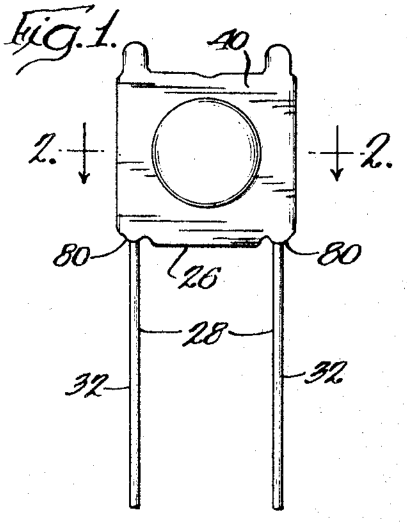
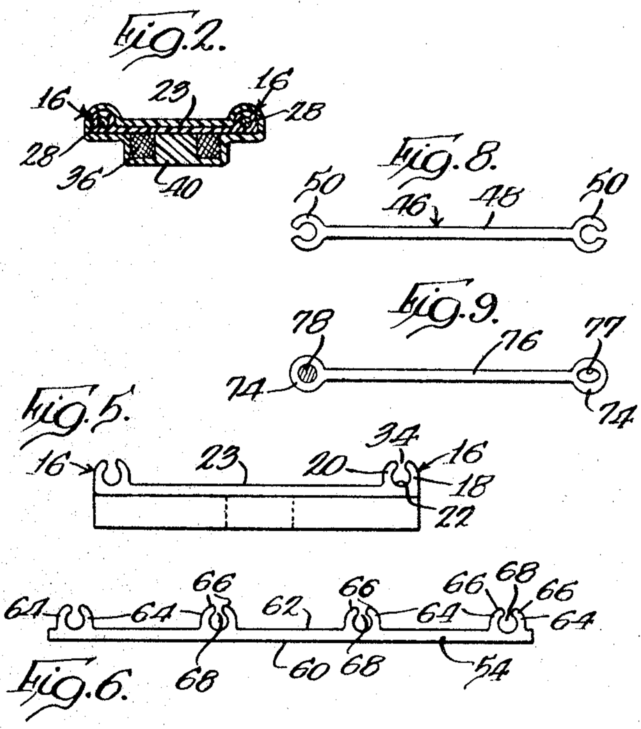
FIG. 2, FIG. 8, FIG. 9, FIG. 5, FIG. 6
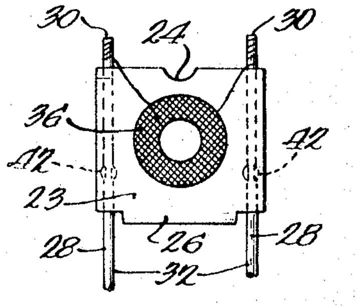
FIG. 3
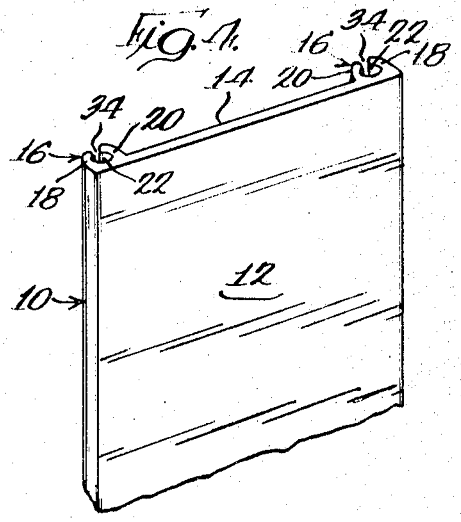
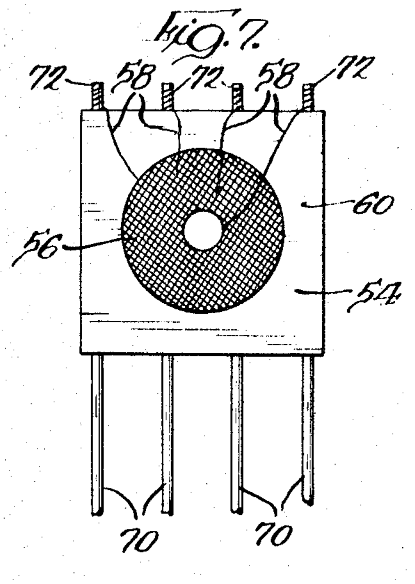
Inventor
Thomas A. Boehmke
By Gradolph, Love, Rogers & Van Sciver
Attys United States Patent Office 3,466,381
Patented Sept. 9, 1969

3,466,381

MOUNTED CIRCUIT ELEMENT

Thomas A. Boehmke, Crystal Lake, Ill., assignor to Coilcraft, Inc., Cary, Ill., a corporation of Illinois Filed Mar. 20, 1967, Ser. No. 624,279
Int. Cl. H01f *15/02;* H05k *5/02*
U.S. Cl. 174—52 12 Claims

ABSTRACT OF THE DISCLOSURE

An electronic circuit component mounted to a rectangular thin plastic substrate having parallel terminal wires extending along opposite edges thereof and beyond the substrate at each end, the leads of the component being soldered to one pair of the projecting ends and the other pair being adapted for insertion in a printed circuit board, the whole but for the other pair being encapsulated in a plastic material.

BACKGROUND OF THE INVENTION

Field of the invention

This invention relates to a mounted circuit element and more narrowly to a circuit element mounted for insertion generally into printed circuit boards.

Description of the prior art

In Patent No. 2,864,064 to Heaton, dated Dec. 9, 1958, there is shown a coil mounted to a rectangular sheet of insulating material with staples extending along opposite sides of the sheet and protruding above and below it. The coil leads are soldered or secured to the ends of the staples protruding above the top edge, and the lower protruding ends are adapted for connection into an electrical circuit such as, for instance, a printed circuit board.

In the U.S. patent applications Ser. No. 387,139, filed Aug. 3, 1964, of Renskers et al., now Patent No. 3,368,-276, issued Feb. 13, 1968, and Ser. No. 482,123, filed Aug. 24, 1965, of Renskers, now Patent No. 3,332,048, issued July 18, 1967, there are disclosed a variety of improvements over the Heaton structure. One difficulty with the Heaton device lies in the fact that in the use of staples, the end lengths of the staples are necessarily limited and also are necessarily limited to substantial equal length, and these applications are directed to ways by which unequal and unlimited end lengths can be provided.

Other objections to the Heaton structure lie in the fact that the staples must be spaced substantially inward from the edges of the rectangle in order that they not tear out, and that they overlie the flat faces of the rectangle on both sides. Both of these factors limit the size coil that can be accommodated on a rectangle of any given size and demand undue mounting space on a circuit board by virtue of their lateral projection beyond the staples.

The Renskers *sole* application, above, is specifically directed to overcoming these last objections and shows the deposit of the terminal wires in the creases of a doubly folded strip of paper. This application is directed to an improved solution of these same problems.

SUMMARY OF THE INVENTION

In the present invention, the terminal wires are held at the edges of the rectangle or mounting board or, as the element will hereafter be identified, the substrate, more positively than with the paper wrap assembly, the fabrication is considerably simpler and substantially less demanding in the way of complex machinery, and the unit cost is less in that a simple extrusion may be used which, with the avoidance of machine and process complexity, will result in a substantial improvement in the expense of manufacture.

The device of the present invention possesses a further advantage over that illustrated in the latter application in that locations for terminal wires may be easily provided which furnish a plane face for circuit element attachment, and more than two terminal wires may be mounted.

Other objects and advantages of this invention will be apparent from the following description and drawings.

BRIEF DESCRIPTION OF THE DRAWINGS

FIG. 1 is a side elevation of a coil mounted in accordance with the teachings of the invention;

FIG. 2 is a section taken along the line 2—2 of FIG. 1 looking in the direction of the arrows;

FIG. 3 is a side elevation similar to FIG. 1 showing the coil without the encapsulation;

FIG. 4 is a perspective view of a length of extrusion used to make the substrate of FIG. 1;

FIG. 5 is a top plan view of a larger coil mounted to the substrate of FIG. 1;

FIG. 6 is a top plan or top edge view of a substrate adapted for the connection of a plurality of terminal wires;

FIG. 7 is a front elevation of a mounted transformer employing the substrate of FIG. 6;

FIG. 8 is a top plan or top edge view of an alternative form of substrate; and

FIG. 9 is a top plan or top edge view of still another form of substrate showing one terminal wire in place.

DESCRIPTION OF THE PREFERRED EMBODIMENTS

The substrate of this invention which constitutes one of its major points of novelty is formed from a continuous extrusion of thermoplastic material. Although many plastic compositions may be adapted to the purposes of this invention, a polycarbonate such as that marketed under the name of "Lexan," a trademark of the General Electric Company, is particularly well suited to the practice of this invention. The suitability will be made apparent later.

The extrusion is illustrated particularly in FIG. 4 and consists of a strip 10 of indefinite length having a flat front side 12 and a back side 14 having longitudinal, longitudinally open sleeves 16 standing outwardly from the edges thereof. The sleeves are defined by pairs of ribs 18 and 20 the free edges of which curve toward each other to give the contained aperture 22 a substantially circular section. The outermost ribs 18 are based on the extreme edge of the extrusion.

The strip 10 is cut into substantially rectangular or square substrates 23 for each individual coil or circuit element mount. Desirably, the substrate is notched centrally in its top edge between the sleeves 16 as at 24 as by semicircular cutout, and a tongue 26 extends centrally downward from the lower edge between the sleeves 16. The purpose of these variations from an exact rectangular shape will be made clear later.

It is the purpose of the sleeves 16 to contain lengths of relative stiff terminal wire 28. In the illustrated embodiment, the wires 28 are proportioned to extend a short distance beyond the sleeves at one end 30 thereof and any desired distance beyond the sleeves at the other end 32 thereof. There is no effective limitation on the extension of the ends 32.

The sleeves 16 are proportioned to be slightly undersized with respect to the desired terminal wire gauge.

The wire is retained in place by the inturned ends of the ribs 18 and 20 and frictionally engaged by positive pressure exerted by the inside surfaces of the sleeves due to the undersizing. The wires may be inserted into the sleeves either by threading them through the length of the sleeve or by snapping them in transversely through the gap 34 between the edges of each of the pair of ribs which together define the sleeves.

The circuit element 36, here shown as a coil, is glued to the flat front face 12 of the substrate 22. The coil leads are wrapped around the short, upwardly extending ends 30 of the terminal wire 28. These ends are then dipped into a solder bath so as to solder the coil leads to the terminal wires. The notch 24 is provided in the top edge of the substrate in order to avoid a possible charred path continuous across the top edge of the substrate as a consequence of the solder dipping. Such paths have been known to short out the element. The notch 24 provides a discontinuity to interrupt any such path.

Thereafter, the assembled and mounted coil is immersed in a dip of a plastic insulating composition which is substantially rigid when set, to cover the substrate, the circuit element, and the soldered ends 30 completely but leaving the longer lower ends 32 of the terminal wires 28 uncoated, thus encapsulating the whole structure except for the lower ends of the terminal wires in a plastic coating 40. A thermosetting phenol-formaldehyde such as "Durez" (a trademark of the Durez Plastics and Chemicals Company) is well suited to this purpose.

Durez normally is cured in these applications by baking at a temperature of 260° F. At this temperature, some trouble has been experienced with a cracking of the coating. It has been found, however, that if the Durez is cured at 220°, the difficulty is avoided. The baking time may be somewhat extended, but not importantly. Polycarbonate serves well as the material as the substrate and was selected for its heat resistance among other more obvious needed properties. Other extrudable plastics having good strength at curing temperatures might well be substituted. Also, while Durez is excellent for the purpose and has good market acceptance, other encapsulating materials which cure or dry at lower temperatures might well be employed which would extend the number of suitable substrate materials.

Parenthetically, while polycarbonate is nominally proof against the higher curing temperature, it is thought that the absorption of alcohol and acetone from the Durez dip acts to soften or swell it and lead to the defective results at the higher curing temperature. On the other hand, however, a positive benefit accrues, possibly from this same effect, in that the Durez bonds strongly directly to the polycarbonate, unlike the "fish paper," the use of which is taught in the above-referred-to patent and applications.

In this invention, as in the invention set forth in the above applications, the basic premise lies in attaching the terminal wires to the substrate in a somewhat impermanent or insecure fashion, only strong enough to withstand the operations involved in coil completion at the manufacturer's site. Ultimate permanence and stability is derived from the Durez encapsulation. It will be appreciated, however, that the frictional engagement of the sleeves upon the terminal wires should be substantial so that the wires will not easily slip longitudinally nor escape from the sleeves. This need for frictional engagement is responsible for the open sleeve. Not only does the open sleeve permit an edgewise insertion of the wire into the sleeve; it also permits the internal diameter of the sleeve being smaller than the wire so as to obtain satisfactory engagement.

It will also be appreciated that it is desirable that the mounted circuit element assembly have good rigidity. The substrate should accurately locate the terminal wires according to a predetermined spacing, and any flexure of the substrate might destroy the bond of the circuit element thereto. The Durez encapsulant provides excellent rigidity. On the other hand, polycarbonate has excellent characteristics of rigidity in itself, and therefore, an encapsulant somewhat less rigid than Durez might well be suitable in conjunction with polycarbonate. With a more flexible substrate, a more rigid encapsulant would be necessary. The encapsulant, however, does more than contribute rigidity (and seal the circuit element against atmospheric or other damage), it also serve to anchor finally the terminal wires within the sleeves.

Here again, though, this measure is or may be partially achieved in a preceding step. In the solder dipping of the lead-wound short ends 30, there may be a partial melting of the sleeve end which will serve to catch the terminal wire and anchor it more effectively in place than the friction alone.

It is also possible to anchor the terminal wires within the sleeves more positively by striking or coining the metal through the sleeve after insertion as at 42 so as to flatten or otherwise distort them. Thus the degree of retention or of anchoring of the wires within the sleeves can be variously graded, depending upon the requirements of use, up to a full encapsulation, and the anchoring means may be additive; that is, there is the original friction retention, the coining, the melted substrate material at the extreme ends of the sleeves and finally the encapsulation, the last three of which may be added alone or in any combination to the first. In other words, where gentle treatment can be assumed, encapsulation may be avoided.

The substrate configuration as originally conceived is illustrated in FIG. 8. Here the extrusion 46 consists of a central web 48 and outwardly opening sleeves 50 on each edge of the web. One objection to this configuration is that the sleeves bulge out beyond the plane of both faces of the central web, and thus limit the diameter of coil which can be attached to the web to the width of the web itself. In contrast, attention is called to FIG. 5 illustrating the preferred form of this invention wherein a coil 50 having a diameter equal to the width of the substrate is secured thereto. The flat face 12 imposes no limitations as to the size of circuit element which the substrate may carry.

The primary structure illustrated in FIGS. 1, 2, 3 and 4 suggests an extrusion which lends itself to the mounting of circuit elements having more than two leads. In FIG. 7 there is shown a substrate 54 mounting a transformer 56 having four leads 58. The transverse section of the extrusion employed for this purpose or the end plan view of a substrate formed therefrom is illustrated in FIG. 6.

Here the extrusion is provided with a plane front or mounting face 60 and a back side 62 having four pair of longitudinally extending ribs 64 spaced transversely across the back. The ribs have curved extremities 66 facing each other so as to define more than semicircular, open sleeves 68. The terminal wires 70 will be deposited in the sleeves 68 in the fashion described above, the transformer 56 mounted to the face of the mounting board, the transformer leads connected to the short upper ends 72 of the terminal wires and soldered, and the whole then encapsulated as described above.

Although open sleeves have been described throughout for the reception of terminal wires, a modification involving closed tubular sleeves suggests itself. Such a modification is illustrated in FIG. 9. Instead of the open sleeves, closed sleeves 74 may be extruded along either edge of the web 76, the sleeves having an elliptical aperture 77 therein, the minor axis of which is smaller in width than the diameter of the intended terminal wires 78. Such a structure would provide the necessary frictional engagement of the sleeve on the wire to retain it in place during circuit element fabrication. Such structure would, of course, necessitate an endwise feeding of the terminal wires 78 thereinto.

Reference was made earlier to the tongue 20 depending from the bottom edge of the substrate illustrated in FIGS. 1 and 2. The dip of the circuit element into the encapsulant should of course be deep enough to cover a small portion of the long ends 32 of the terminal wires immediately as they emerge from the sleeves 22 in order to obtain an anchoring of the wire below as well as above the sleeves.

It has been concluded that the insertion of these conical tips 80 into the holes of the printed circuit board acts deleteriously to the soldering of the element to the board. It is presumed that plugging the printed circuit board holes with the tips prevents a wicking of the solder up into the holes which contributes to a good solder joint. Thus, some air space around the terminal wires within the circuit board holes is desirable. The tongue 26 has the effect of permitting an immersion of the mounted circuit element into the encapsulant so as to obtain the necessary covering of the lower end of the sleeves and adjacent terminal wire portions, but upon insertion of the terminal wires into their appropriate holes in a printed circuit board, the tongue will limit the depth of insertion of the terminal wires so that an uncoated or unencapsulated portion thereof will be contained within the holes and the holes will be open on the top side.

Although the coils or circuit elements have been shown herein as being mounted to the substrate by gluing or the like, it should be appreciated that the insertion of the circuit elements into apertures in the web of the substrate as taught in the above-mentioned application of Renskers et al. is definitely contemplated in the utilization of this circuit element mount.

From the foregoing description it will be appreciated that a coil mount has been described which is adapted to the mounting of a wide variety of circuit elements and which is inexpensive and occupies little room on a chassis or on a printed circuit board. The terminal wires occupy the extreme edges of mounting board and so avoid overhang which is space consuming. They may be located on one side of the mounting board so that the other face of the board is plane and so that the size of the circuit element to be mounted is not limited by the spacing between the terminal wires. Furthermore, the same teaching extends to the provision of more than two terminal wires for such circuit elements requiring them, to permit the mounting of transformers and the like which have more than two leads.

I claim:

1. A mounted circuit element assembly comprising a substrate having a pair of parallel, integral, preformed, more than semi-circular sleeves, longitudinally open to be less than full-circular, a terminal wire contained in each sleeve and engaged thereby, said wires extending beyond said sleeves at at least one end thereof, said circuit element being mounted to said substrate out of electrical contact with said wires, and the leads of said element being connected to said terminal wire ends beyond said sleeves.

2. The combination as set forth in claim 1 wherein the sleeves have an empty transverse dimension less than the diameter of said wires.

3. The combination as set fort hin claim 1 wherein the engagement of said terminal wires within said sleeves is frictional.

4. The combination as set forth in claim 1 wherein said terminal wires extend beyond both ends of said sleeves and including additionally a plastic material encapsulating the whole of said assembly other than the terminal wire ends at the other end of substrate.

5. The combination as set forth in claim 4 wherein said plastic material is a rigid thermosetting composition.,

6. The combination as set forth in claim 1 wherein said substrate comprises a length of plastic extrusion, said sleeves extending longitudinally of said extrusion.

7. The combination as set forth in claim 1 wherein said substrate has a uniform transverse cross-section over essentially the whole of its length.

8. The combination as set forth in claim 1 wherein said substrate is substantially rectangular, said sleeves extend along opposite edges of said substrate and said circuit element is mounted to said substrate between said sleeves.

9. The combination as set forth in claim 1 wherein wherein said substrate has a plane side and a back side on which said sleeves are formed, and said circuit element is mounted to said plane side.

10. The combination as set forth in claim 9 wherein said circuit element possesses more than two leads for independent external connection and said back side includes as many sleeves and as many sleeve-contained terminal wires as said circuit element has of said leads, said leads being each connected to an independent terminal wire.

11. A mounted circuit element assembly comprising a substrate having a pair of parallel, integral, preformed, more than semi-circular sleeves, longitudinally open to be less than full-circular, a terminal wire contained in each of said sleeves and engaged thereby, said wires extending beyond said sleeves at both ends thereof, said circuit element being mounted to said substrate out of electrical contact with said wires and leads thereof being connected to the terminal wire ends at one end of said substrate.

12. A mounted circuit element assembly comprising a substrate having a pair of parallel, integral, preformed, elliptical sleeves thereon, a terminal wire contained in each of said sleeves, said sleeves having a minor axis when empty less than the diameter of the wire, said wires extending beyond said sleeves at at least one end thereof, said element being mounted to said substrate out of electrical contact with said wires, and the leads of said element being connected to said terminal wires beyond said sleeves.

References Cited

UNITED STATES PATENTS 3,332,048 7/1967 Renskers ------------ 336—65

DARRELL L. CLAY, Primary Examiner

U.S. Cl. X.R.

29—627; 206—65; 336—65, 192